2,674,931

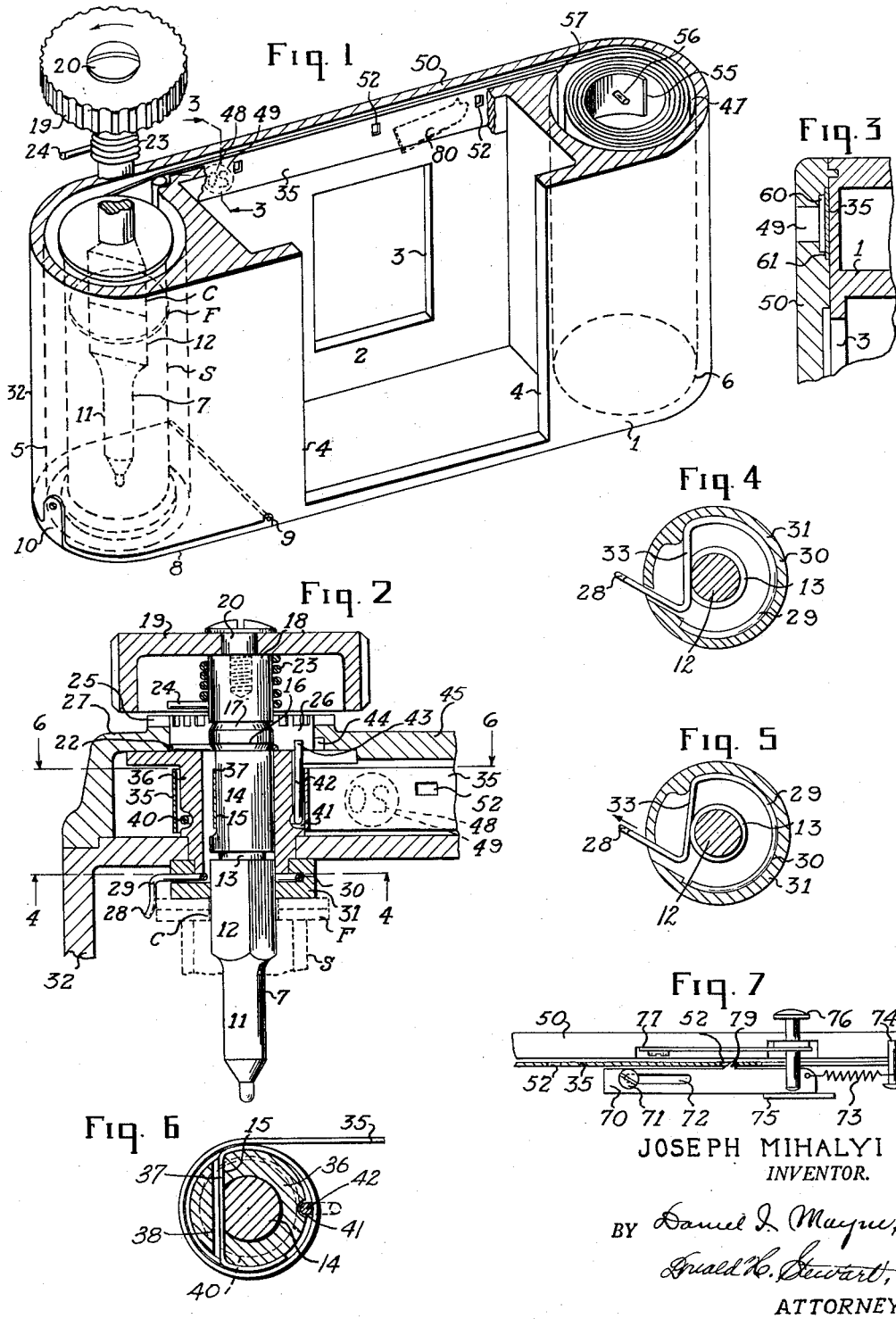
April 13, 1954 — J. MIHALYI — 2,674,931
FILM WINDING CONTROL FOR EXTRUSION LOADING CAMERAS
Filed Feb. 13, 1951
JOSEPH MIHALYI
INVENTOR.
ATTORNEYS Patented Apr. 13, 1954

UNITED STATES PATENT OFFICE 2,674,931

FILM WINDING CONTROL FOR EXTRUSION LOADING CAMERAS

Joseph Mihalyi, Rochester, N. Y., assignor to Eastman Kodak Company, Rochester, N. Y., a corporation of New Jersey Application February 13, 1951, Serial No. 210,710

13 Claims. (Cl. 95—31)

1

This invention relates to photography and, more particularly, to roll-holding cameras. One object of my invention is to provide a roll-holding camera of the so-called extrusion loading type in which film, on an original spool, is placed in the camera, is extruded or completely unwound in a spool chamber, and then is exposed, one exposure at a time, as the film is moved in a reverse direction back upon the original spool. Another object of my invention is to provide a camera of the general type described in which means is provided to lock the winding knob against motion in either direction when film is out of the camera. This prevents improper operation of the winding mechanism and retains the film-measuring means in proper phase with the film-winding handle. Another object of my invention is to provide a camera in which the film is measured by a spring-metal tape so that no strain is imposed on the film during the metering operations. Another object of my invention is to provide a mechanism by which the tape and filmwinding key-post may be moved together, or by which the winding key-post may be held against movement by the tape. A still further object of my invention is to provide a camera which will require a minimum effort in loading and unloading, and which will accurately measure the required area of film for each exposure without attention from an operator. A still further object of my invention is to provide a camera in which the film-winding knob may be turned in one direction for extruding the film into a loose coil, and may be turned only in a reverse direction for measuring lengths of film for exposure. A further object of my invention is to prevent the operation of the winding key in one direction by means of a clutch member automatically controlled by the tape and engageable with the camera body. Other objects will appear from the following specification, the novel features being particularly pointed out in the claims at the end thereof.

Cameras have been suggested in which the extrusion-loading principle is utilized, turning a winding key in one direction to extrude film in a loose coil, and in an opposite direction to wind the film back upon an original spool, exposing the film intermittently during its return movement. Film cartridges can be very easily loaded into such cameras; but the difficulty has arisen in properly controlling the film winding in both directions so that the user of the camera does not have to take steps to prevent too much unwinding, or too much winding-up of the

2 mechanism. My present invention is particularly directed to overcoming the above-known types of difficulties and, in addition, to providing a camera with a winding mechanism which can only, during normal operation, be turned in the proper direction for extruding the film into a loose coil before exposure, and for winding the film back onto the original spool. Moreover, provision is made to prevent the turning of the winding key in either direction when there is no film spool in the camera, since such movement of the winding key would get the film-measuring tape out of phase with a film which might later be placed in the camera if the winding key could be turned before a spool is placed in the camera.

Coming now to the drawings wherein like reference characters denote like parts throughout:

Fig. 1 is a perspective schematic view partially in section showing a camera constructed in accordance with and embodying a preferred form of my invention;

Fig. 2 is an enlarged detail in section taken through the winding mechanism and a portion of the measuring tape;

Fig. 3 is a section taken on line 3—3 of Fig. 1; this figure being a fragmentary detail of the slot which guides the tape across one end of the exposure frame and from one spool chamber to the other;

Fig. 4 is a fragmentary sectional detail taken on line 4—4 of Fig. 2, but showing the spring latch in the position it assumes when the spool is out of the camera;

Fig. 5 is a view similar to Fig. 4 but showing the spring latch in a released position which it assumes when a film spool is in the camera, as shown in Fig. 2;

Fig. 6 is a fragmentary sectional view taken on line 6—6 of Fig. 2; and

Fig. 7 is a fragmentary detail of a typical film-stopping latch which may be used with the present embodiment of my camera.

My device consists broadly in a film-metering and safety device for extrusion-loading cameras. It is designed to latch the film-winding knob against movement in either direction when a film spool is removed from a camera, and to unlatch the unwinding mechanism when a film spool is loaded into a film chamber. It further is arranged so that by pulling out the knob, a one-way clutch is released, permitting the film and a measuring tape to be extruded into loose coils by turning the knob in one direction; and, when this movement is completed, the flexible tape releases a clutch mechanism which prevents further unwinding movement of both the film and the tape. The film-winding knob is then thrust inwardly, engaging a one-way clutch, so that the knob can now only be turned in a winding direction to wind up film on the original spool, intermittently exposing the film as it passes an exposure aperture. When all of the film has been exposed, further movement of the film-winding knob is prevented by a stop mechanism. Therefore, the knob cannot be turned in either direction until the film spool is removed unless the knob is pulled out first. Thus, an extrusion-loading camera is made substantially foolproof, and it is so constructed that loading and unloading can be accomplished with very little effort by merely sliding a film spool axially onto a film-winding post and closing the door.

More specifically, a typical camera may consist of a camera body 1 having an inner frame 2 provided with an exposure opening 3 in the usual manner. Spaced walls 4 may support an objective in a shutter which may be of any known type. The camera is provided with two spool chambers 5 and 6, the former being adapted to support a spool S on a winding key-post 7 which may be loaded into the camera through a door 8 hinged at 9 to the camera body and being provided with a suitable snaplatch 10. The winding key-post 7 preferably has a round bottom section 11 and a polygonal upper section 12: this polygonal section having any desirable number of sides, preferably three or four. Above the polygonal portion there is a groove 13 from which the shaft extends upwardly at 14 having a flat section 15, as indicated in Fig. 2. There are two grooves 16 and 17 in the shaft which extends upwardly to a shoulder 18 supporting a film-winding knob 19 through a screw 20 engaging the upper part of the shaft 14.

The shaft 14 is spring-latched in either its drawn-out position shown in Fig. 2, or a pressed-in position when a spring 22 engages either the notch 16 or the notch 17. When in its raised position shown in Fig. 2, the spring 22 engages the notch 16 and permits the shaft 14 to be turned in a film-extruding direction. This can be accomplished because the one-way clutch 23 consists of a spring closely encircling the shaft 14 and having an outstanding arm 24 which is raised above the various notches 25 which are formed between the upstanding teeth 26 of the upwardly projecting flange 27. When the winding key is pressed downwardly so that the spring 22 engages the notch 17, the arm 24 of the one-way clutch engages an aperture 25, thereby holding the knob against movement in an unwinding direction and permitting the knob to turn only in the direction shown by the arrow in Fig. 1.

When a film spool S is in place, as shown in Fig. 2, the flange F of the film spool may engage a downwardly projecting arm 28 of a spring member 29 normally lying in the groove 30 of the annular member 31 forming a part of the camera body end 32. A straight-line portion 33 of this spring is moved outwardly from the groove 13 by the flange F of the film spool S so that the shaft 14 may always be moved between its two positions as defined by the grooves 16 and 17 when a film spool is in place. Fig. 4 illustrates the latching position of the straight-line portion 33 of this spring, as, in this view, the spring lies in a portion of the notch 13.

The reason for latching the shaft 14 against movement when a spool is not in place is that if the winding knob could be turned, a measuring tape, which will hereinafter be described, might be moved out of phase with the winding mechanism so that it could not properly control the film movement.

The film is largely controlled in its movement in both directions by means of a spring band 35 which is preferably of metal, such as steel, and which has been formed in such a manner that it tends to curl up. The band 35 may be attached to a sleeve 36 mounted to turn with and slide on the shaft 14, the end of the spring 37 being passed through a slot 38 in the sleeve 36 and lying across the flat 15 formed on the shaft 14. The length of this flat is sufficient to permit movement of the shaft 14, as above described, and the sleeve turns with the shaft 14.

There is a clutch member carried by the sleeve 36 consisting of a spring member 40, as shown in Fig. 6; this spring member lying in a groove 41 in the sleeve and being bent upwardly and normally outwardly at 42. When a convolution of the spring band 35 lies over the upwardly extending arm 42, it is held against the sleeve 36 and the sleeve and post 14 may turn together. When, however, the spring 35 has been unwound, so that a convolution no longer lies over the arm 42, it may turn so that the upper end 43 may swing outwardly and may engage a notch 44 in the camera wall 45, thereby latching the post 14 against further turning in a counterclockwise direction with respect to Fig. 2, or against the direction of the arrow shown in Fig. 1. This position is reached when the film and the spring have both been extruded into the spool chamber 6 and into the spring chamber 47.

The spring tape 35 is preferably provided with exposure-designating numerals 48 on the tape so that these numerals may be viewed through a suitable window 49 carried by the back wall of the camera, enabling an operator to determine the number of exposures. The spring tape is also preferably provided with a series of apertures 52 which are spaced apart the necessary distance to measure an exposure area behind the exposure frame 3 and leave the necessary margin between the exposure areas. There is also carried on the end 55 of the tape a stop pin 56 which may engage the camera wall at 57 when the tape is wound back on the sleeve 36, thus halting further movement of the shaft 14 in a film wind-up direction.

The tape 35 is preferably provided with a guideway comprising grooves 60 and 61 formed between the camera back 50 and the camera body designated broadly as 1 so that the tape will be held in a definite path across the exposure frame 3. While so held, it may engage a pawl 70, as shown in Fig. 7; this pawl being mounted to turn and slide on a pin 71 because of the slot 72. A spring 73 holds the pawl in the direction shown in Fig. 7; this spring being attached to the pawl and to a pin 74. A flange 75 lies in the path of a pushbutton 76 normally held away from the camera back 50 by means of a leaf spring 77, so that when the pushbutton 76 is depressed, a tooth 79 may be moved out of a perforation 52, and, when so moved, the spring will move the pawl to the position shown in Fig. 7 where it engages a perforation. By turning the winding knob, the pawl will move tensioning the spring 73 until the next area of film is properly positioned, at which time the pawl can move no further because of the slot 72, and movement of the film will, accordingly, be stopped because the tape will not permit further winding. The tooth 79 travels a smaller distance than the film and, consequently, will ride on the tape 35 until it is reached by the next successive notch 52.

It will be noted from Fig. 3 that the window 49 exposes the numerals 48 on the tape so that they may be viewed from the back of the camera and so that the exposure numbers may be determined.

With the parts described above, the operation of the camera is extremely simple. Assuming no spool is in the camera, the winding knob 19 cannot be turned in any direction because the one-way clutch 23 prevents turning the knob in an unwinding direction to extrude film, and because the pin 56, resting on the flange 57, prevents the knob from being turned in a wind-up direction to wind the film onto the supply spool. To condition the camera for exposures, the snaplatch 10 is released and the door is opened, exposing the end of the winding key-post 7. A film spool is placed on this rounded end and moved upwardly until the configuration C in the film spool engages the polygonal portion 12 of the winding key-post. By pushing the spool upwardly as far as it will go, the flange engages the spring latch 28, moves it from the latching position in Fig. 4 to the unlatching position in Fig. 5, so that the winding key may now be drawn axially to its Fig. 2 position. Meanwhile, the door 8 has been closed and the spool is held on the winding key-post.

After the key has been moved to its Fig. 2 position, because the one-way clutch 23 is released, the knob 19 may be turned against the direction of the arrow in Fig. 1 to extrude both the film and the measuring tape 35 to the take-up chamber 6 and the tape chamber 47. The winding knob is turned until the last convolution of the tape moves away from the spring arm 43 which then turns outwardly and engages the notch 44, thereby stopping the unwinding movement of the tape and film. The winding key is then moved to its innermost position with the spring 22 engaging the notch 17.

This movement engages the arm 24 of the one-way clutch 23 with a notch 25 between a pair of upstanding lugs 26 and prevents movement of the winding knob except in the direction shown by the arrow in Fig. 1. The knob is turned in this direction while the tooth 79 rides along the surface of the metal tape, dropping in the first available aperture 52. The latch continues moving with the tape, this movement being opposed by the spring 73 until no further movement of the latch can take place, so that the winding movement of the knob 19 is stopped. An exposure may then be made and, by pressing the button 76, the latch 79 may be moved from the notch 52 so that the spring 73 may again draw the tooth 79 along the surface of the metal tape, so that when the winding key 19 is again turned, member 79 may drop in the next available notch 52, and so on, until all the exposures have been made. After the last exposure is made, there are no more perforations in the tape 35. This permits sufficient winding movement for a number of convolutions of film to wind on the film spool and to render it light-tight. When this occurs, the pin 56 comes in contact with the flange 57 and halts further movement of the winding knob so that the knob cannot now be turned in either direction because of the pin 56 in flange 57 and because of the one-way clutch 23. The operator then opens the door 8, removes the film spool, and the winding key 19 will remain latched against movement until a fresh film spool is inserted.

If desired, the tape, instead of operating a manually releasable latch, as shown in Fig. 7, may operate a lever 80 forming a part of a double-exposure prevention device, as shown in my copending application, Serial No. 214,959 filed March 10, 1951 for Tape Controlled Camera Shutter and Release and now U. S. Patent No. 2,629,302, issued February 24, 1953.

It will be noted from the above description that for all intents and purposes an extrusion type of roll-film camera can be made substantially foolproof so that it is highly improbable that improper operation of the winding mechanism will take place.

While I have described a preferred embodiment of my invention and one which is well suited for production, it is possible that other embodiments may readily be made so that I consider as within the scope of my invention all such forms as may fall within the scope of the appended claims.

Having thus described my invention, what I claim is new and desire to secure by Letters Patent of the United States is:

1. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position.

2. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted in the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position, said one-way clutch between the winding key post and knob being disconnected when the winding key post is moved to its second coaxial position whereby the knob may then be turned in either direction.

3. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position, a second spring clutch member between the sheave and the camera body adapted when released to engage and connect the sheave and camera body to prevent rotative movement of the sheave relative to the camera body.

4. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position, a second spring clutch member between the sheave and the camera body adapted when released to engage and connect the sheave and camera body to prevent rotative movement of the sheave relative to the camera body, said second spring clutch member lying in the path of the spring band as it is wound about the sheave whereby a convolution of the spring band wound about the sheave may hold the second spring clutch member in an inoperative position.

5. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position, a second spring clutch member between the sheave and the camera body adapted when released to engage and connect the sheave and camera body to prevent rotative movement of the sheave relative to the camera body, said second spring clutch including an arm spring pressed to turn away from the sheave and into engagement with a notch in the camera body to hold the sheave against movement with respect to the camera body when a convolution of the spring band may release the spring arm when the spring band is unwound from the sheave.

6. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position.

7. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position in which the key post is in the first axial position permitting the knob to turn in one direction only.

8. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position in which the key post is in the first axial position permitting the knob to turn in one direction only, and a latch releasing arm projecting into the path of a spool positioned on the key post to hold the latch in a position to release the key post for movement when a spool is in place on the key post.

9. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position, and a spring actuated latch releasing arm tending to move to a latch engaging position to hold the key post against axial movement, said spring actuated latch releasing arm lying in the path of a spool positioned on the key post to be moved thereby to a latch releasing position whereby moving a spool from the key post may cause the latch to move to a latching position.

10. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position, and a spring actuated latch releasing arm tending to move to a latch engaging position to hold the key post against axial movement, said spring actuated latch releasing arm lying in the path of a spool positioned on the key post to be moved thereby to a latch releasing position whereby moving a spool from the key post may cause the latch to move to a latching position, a stop pin carried by the spring tape, a camera abutment lying in the path of the stop pin to prevent movement of the spring tape in one direction when the stop pin engages the camera abutment.

11. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position, and a spring actuated latch releasing arm tending to move to a latch engaging position to hold the key post against axial movement, said spring actuated latch releasing arm lying in the path of a spool positioned on the key post to be moved thereby to a latch releasing position whereby moving a spool from the key post may cause the latch to move to a latching position, a stop pin carried by the spring tape, a camera abutment lying in the path of the stop pin to prevent movement of the spring tape in one direction when the stop pin engages the camera abutment whereby the spring tape may halt further movement of the sheave and thereby further movement of the winding key post.

12. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position, and a spring actuated latch releasing arm tending to move to a latch engaging position to hold the key post against axial movement, said spring actuated latch releasing arm lying in the path of a spool positioned on the key post to be moved thereby to a latch releasing position whereby moving a spool from the key post may cause the latch to move to a latching position, a stop pin carried by the spring tape, a camera abutment lying in the path of the stop pin to prevent movement of the spring tape in one direction when the stop pin engages the camera abutment whereby the spring tape may halt further movement of the sheave and thereby further movement of the winding key post, the said one-way spring clutch preventing the knob from turning in a direction in which the flexible tape is unwound from the sheave when the winding key post is in its first position and the stop pin on the flexible tape and the camera abutment when in contact preventing the knoob from being turned further in a direction for winding the flexible tape on the sheave, whereby the knob may be held against movement in either direction.

13. A camera film winding control comprising, in combination, a camera body, an exposure frame, a film chamber at each side of the exposure frame, a winding key post extending into one spool chamber and having a winding knob thereon, a spring band of the type tending to move into a coil and extending across the camera body between the two spool chambers, apertures in the spring band defining exposure areas of a film lying behind the exposure frame, a pawl carried by the camera body and resting on the spring band and engaging the perforations therein, said pawl lying between the ends of the spring band to stop movement of the spring band in one direction and permit movement of the spring band relative to the camera body, a sheave for connecting one end of the spring band to the winding key post, the sheave being mounted on the key post to turn with the key post and to slide axially relative thereto, said key post having a first and a second coaxial position with respect to the camera body, and a one-way clutch between the key post and camera body permitting movement of the winding knob in one direction only when the key post is in the first coaxial position and a latch for holding the winding key post in one axial position, and a spring actuated latch releasing arm tending to move to a latch engaging position to hold the key post against axial movement, said spring actuated latch releasing arm lying in the path of a spool positioned on the key post to be moved thereby to a latch releasing position whereby moving a spool from the key post may cause the latch to move to a latching position, a stop pin carried by the spring tape, a camera abutment lying in the path of the stop pin to prevent movement of the spring tape in one direction when the stop pin engages the camera abutment whereby the spring tape may halt further movement of the sheave and thereby further movement of the winding key post, the said one-way spring clutch preventing the knob from turning in a direction in which the flexible tape is unwound from the sheave when the winding key post is in its first position and the stop pin on the flexible tape and the camera abutment when in contact preventing the knob from being turned further in a direction for winding the flexible tape on the sheave, whereby the knob may be held against movement in either direction, the latch being released from its inoperative position by removing a spool from the winding key shaft, thereby latching the key post against axial movement and preventing movement of the knob in any direction until a spool is again placed on the winding key post releasing the latch and enabling an operator to move the key post axially to its second coaxial position for again turning the winding key in a spring tape unwinding direction.

References Cited in the file of this patent

FOREIGN PATENTS

| Number | Country | Date |
|--------|---------|------|
| 177,607 | Great Britain | Mar. 31, 1922 |
| 447,901 | Great Britain | May 19, 1936 |